US006601436B1

(12) United States Patent
Senda et al.

(10) Patent No.: US 6,601,436 B1
(45) Date of Patent: Aug. 5, 2003

(54) APPARATUS AND METHOD FOR DETECTING AND PROCESSING IMPACTS TO AN ELECTRONIC PERCUSSION INSTRUMENT

(75) Inventors: Kenji Senda, Hamakita (JP); Yasunobu Miyamoto, Shizuoka (JP)

(73) Assignee: Roland Corporation, Osaka (JP)

( * ) Notice: Subject to any disclaimer, the term of this patent is extended or adjusted under 35 U.S.C. 154(b) by 66 days.

(21) Appl. No.: 09/771,375

(22) Filed: Jan. 26, 2001

(51) Int. Cl.[7] ............................................ G01M 7/00
(52) U.S. Cl. ............................................ 73/12.09
(58) Field of Search ............................ 73/12.01, 12.04, 73/12.05, 12.07, 12.08, 12.09, 11.01

(56) References Cited

U.S. PATENT DOCUMENTS 3,960,106 A * 6/1976 De Brey ................... 116/67 R
4,479,412 A * 10/1984 Klynas ........................ 84/730
5,095,433 A * 3/1992 Botarelli et al. ............ 235/400
5,336,959 A * 8/1994 Park et al. .................. 310/328
5,374,775 A * 12/1994 Kawamura et al. ........... 84/615
6,179,720 B1 * 1/2001 Rankin et al. .............. 473/154

* cited by examiner

*Primary Examiner*—Max Noori
(74) *Attorney, Agent, or Firm*—Foley & Lardner

(57) ABSTRACT

An apparatus for detecting and processing impacts to an electronic percussion instrument is disclosed. The apparatus includes a pad for being impacted with an impact pressure at an impact point, and several sensors. One sensor is located in close proximity to the pad for producing a first output value corresponding to the impact pressure, and another sensor located in close proximity to the pad for producing a second output value corresponding to the impact point and the impact pressure. A processor determines a computed impact point from the first and second output values, and controls output sound in conformance with the computed impact point.

45 Claims, 8 Drawing Sheets

STANDARD POINT SENSOR OUTPUT TABLE

| PRESSURE SENSOR OUTPUT VALUE | PIEZOELECTRIC SENSOR OUTPUT VALUE |
|---|---|
| 1 | P1 |
| 2 | P2 |
| 3 | P3 |
| ⋮ | ⋮ |
| 127 | P127 |

FIG. 4

TONE QUALITY CONTROL BY MEANS OF THE LOCATION

CONTROL OF THE PARAMETER VALUE (PAN POT) BY MEANS OF THE LOCATION

APPARATUS AND METHOD FOR DETECTING AND PROCESSING IMPACTS TO AN ELECTRONIC PERCUSSION INSTRUMENT

CROSS-REFERENCE TO RELATED APPLICATIONS

Embodiments of the present invention claim priority from Japanese Patent Application Serial No. 2000-066241, filed Mar. 10, 2000. The content of this application is incorporated by reference herein.

BACKGROUND OF THE INVENTION

1. Field of the Invention

The present invention relates, generally, to electronic percussion instruments and, in preferred embodiments, to electronic percussion instruments having the capability of sensing and determining the point of impact and the impact pressure on a pad, and processing sensor information to control output sounds in conformance with the point of impact and impact pressure.

2. Description of Related Art

In electronic percussion instruments of the past, the location at which the surface of the pad has been struck with such things as a stick (hereafter, referred to as "the location of the point of impact") is detected and the control each of the various parameters and such of the musical tone that is generated by the sound source is carried out in conformance with the location of the point of impact and the striking strength.

Examples of prior methods for the detection of the location of the point of impact are described below.

Method 1: This is a method in which, for example, one piezoelectric device is arranged on the pad case as a vibration sensor with which the striking of the impact surface is detected, the vibrations that have been transmitted to the case when the impact surface has been struck are detected by the piezoelectric device, the frequency characteristics of the detection output signal are analyzed by the processor (CPU) and the location of the point of impact is determined based on the fact that the frequency characteristics will be different depending on the variation in the transmission path in accordance with the location of the point of impact.

Method 2: This is a method in which two piezoelectric devices are arranged in separate locations on the pad case and since, due to the fact that the paths along which the striking vibrations reach said two piezoelectric devices will differ in conformance with the location of the point of impact of the striking and the size of the output values of the two piezoelectric devices will each be different, the location of the point of impact is determined by a comparison of the output values of the two piezoelectric devices.

Method 3: This is a method in which the impact surface of the pad is divided virtually into a multiple number of regions, a pressure sensitive device is established for each divided region so that they act mutually independently and, when the impact surface is struck, by means of the output of a detection signal from any of the multiple number of pressure sensitive devices, the region of the pressure sensitive device for which there has been an output is determined to be the location of the point of impact.

The determination of the location of the point of impact is possible with the use of any of the methods discussed above. However, each of the methods has problems such as those described below.

In Method 1, for each time there is a striking, the frequency characteristics of the output signal of the piezoelectric device are analyzed by the processor. However, since the complicated calculations for this analysis must be carried out instantaneously, there is a great load placed on the processor and there is a danger that other internal processing will be delayed.

In Method 2, there is no way that the method can be applied without the detection of the location of the point of impact by the second piezoelectric device and the fact that two of the same kind of sensor device (the piezoelectric device) must be specially established on a single pad may cause much waste with respect to cost.

In Method 3, since the pad is divided into a multiple number of regions by a multiple number of pressure sensitive devices, which region has been struck can be ascertained, however, it is not possible to know in greater detail what specific area within the region has been struck. If it is designed so that the number of divisions of the previously mentioned regions are made more numerous and smaller regions are produced, it is possible technologically to detect the location of the point of impact virtually without gradations but, in actuality, since the number of wires becomes large and complicated and the cost becomes high, it is not desirable.

SUMMARY OF THE DISCLOSURE

Therefore, it is an advantage of embodiments of the present invention to provide an apparatus and method for detecting the point of impact on an electronic percussion instrument with a small number of sensors rather than a large array of sensors, which provides the added advantages of reducing the processing load on the processor that receives output values from the sensors and minimizing device complexity.

It is a further advantage of embodiments of the present invention to provide an apparatus and method for controlling the musical tone in conformance with the point of impact, and for controlling different musical tone parameters using the output values of multiple sensors.

These and other advantages are accomplished according to an apparatus for detecting and processing impacts to an electronic percussion instrument. The apparatus includes a pad for being impacted with an impact pressure at an impact point, and several sensors. One sensor is located in close proximity to the pad for producing a first output value corresponding to the impact pressure, and another sensor located in close proximity to the pad for producing a second output value corresponding to the impact point and the impact pressure. A processor determines a computed impact point from the first and second output values, and controls output sound in conformance with the computed impact point.

These and other objects, features, and advantages of embodiments of the invention will be apparent to those skilled in the art from the following detailed description of embodiments of the invention, when read with the drawings and appended claims.

BRIEF DESCRIPTION OF THE DRAWINGS

FIG. 4 is a drawing that shows a standard point sensor output table which is stored in the ROM of the electronic percussion instrument according to an embodiment of the present invention;

DETAILED DESCRIPTION OF PREFERRED EMBODIMENTS

Figure 1:
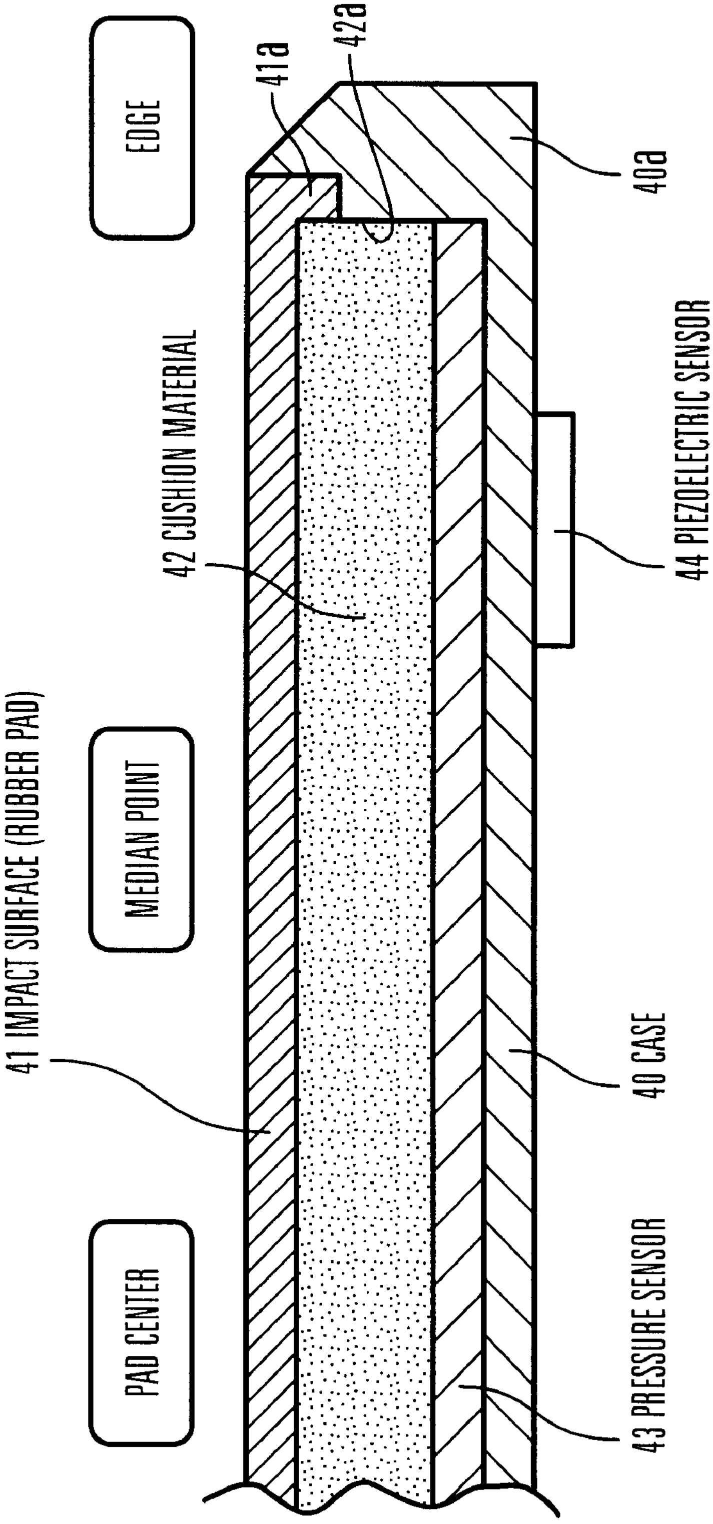
FIG. 1 is a cross-section diagram of the side of the pad of an electronic percussion instrument according to an embodiment of the present invention.

In the following description of preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the preferred embodiments of the present invention.

In order to solve the problems discussed above, the electronic percussion instrument related to the present invention is one in which, for an electronic percussion instrument in which striking is detected and musical tone generation control is carried out for the sound source, the electronic musical instrument is equipped with a pad that is struck by the performer, and the first sensor that is established on the pad and which produces an output value that corresponds to the strength of the striking without the output characteristics depending on the location of the impact point no matter in what place on the pad impact surface it is struck, and the second sensor that is established on the above mentioned pad, the output characteristics of which depend on the location of the impact point on the pad impact surface, and which produces an output value that corresponds to the location of the impact point as well as the strength of the striking, and an impact point location detection means that detects the location of the impact point on the pad impact surface from the output values of the first sensor and the second sensor, and a control means that controls the sound source in conformance with the location of the impact point that has been detected by the impact point location detection means.

With this electronic percussion instrument, it is possible to carry out the control of the musical tone in conformance with the location of the point of impact that has been detected by the impact point location detection means and it is also possible to control each of the different musical tone parameters using the output value of the first sensor and the output value of the second sensor of the pad, being able to effectively utilize each sensor.

The above mentioned impact point location detection means is equipped with a reference table that has been derived in advance with regard to various striking strengths for the output values of the first sensor and the output values of the second sensor when a specified location on the pad surface has been struck, and the location of the impact point is derived by comparing the output value of the first sensor and the output value of the second sensor when said impact surface is struck with said reference table.

In addition, the above mentioned pad can be have a structure as, for example, the following. A structure is established in which the impact surface is attached on the upper surface side of the impact surface support body that is formed from a rigid body and, together with this, the striking vibrations that are transmitted to the impact surface support body in a direction that fall perpendicularly below the point of impact at the time of striking the impact surface are attenuated or isolated. Using this structure as an illustration, a cushioning material with which the vibrations are absorbed and attenuated may be sandwiched between the impact surface and the impact surface support body or it may be a structure such as one in which the edge areas are affixed so that an empty space is made between the impact surface and the impact surface support body. In addition, the first sensor which detects the pressure, when the impact surface is struck, that is received by said impact surface is established flat against the underside in a required region of the impact surface. Together with this, the second sensor which detects the vibrations of the striking when the impact surface is struck is attached to the impact surface support body so that the length of the vibration transmission path is different in conformance with the location of the point of impact on the impact surface. Because of this, two types of sensors, the respective characteristics of which are different (pressure detection and vibration detection), are used and it is possible to detect the location of the point of impact.

With the pad discussed above it is possible to have a structure in which the impact surface has been divided into a multiple number of regions and first sensors are mutually independently established for each region.

An explanation will be given below of preferred embodiments of the present invention while referring to the drawings.

Figure 2:
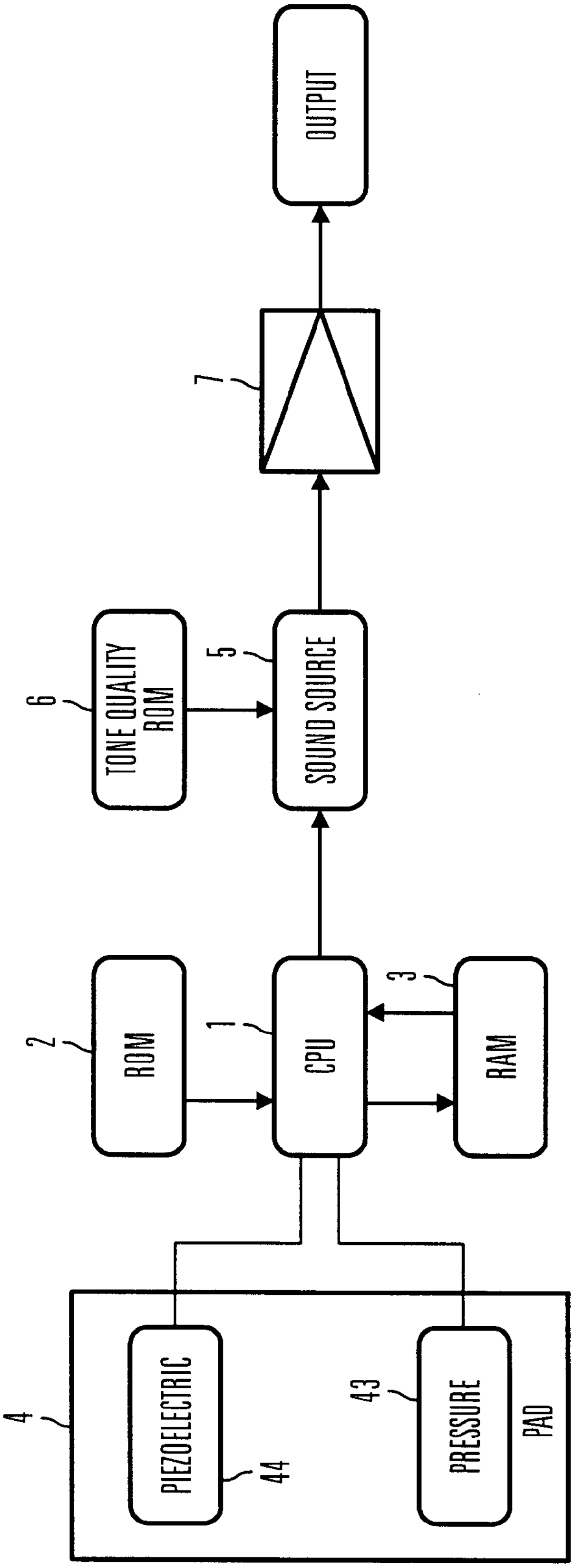
FIG. 2 is a drawing that shows a block structure of an electronic percussion instrument (an electronic drum) according to an embodiment of the present invention.

FIG. 2 shows a block structure of an electronic percussion instrument as one preferred embodiment of the present invention. This electronic percussion instrument is, specifically, an electronic drum. In the drawing, the CPU 1 is the central processing unit and carries out each kind of processing including the detection of the location of the point of impact on the pad impact surface. The ROM 2 is the read only memory in which the programs used for control and the various tables such as the standard point sensor output table and the like that will be discussed later are stored and the RAM 3 is the random access memory that is utilized for such things as the operating area of the CPU 1. The pad 4 is the thing that is struck on its impact surface and with which the performance by the electronic drum is carried out. Its detailed structure will be discussed later. The sound source is a system with which such things as the tone quality of the generated musical tones and various kinds of effects are controlled in accordance with instructions from the CPU 1 and the tone quality table that is stored in the tone quality ROM 6 is used for that tone quality control. The amplifier 7 amplifies the musical tone signals that have been generated by the sound source 5 and outputs them to a speaker system that is not shown in the drawing.

Figure 3:
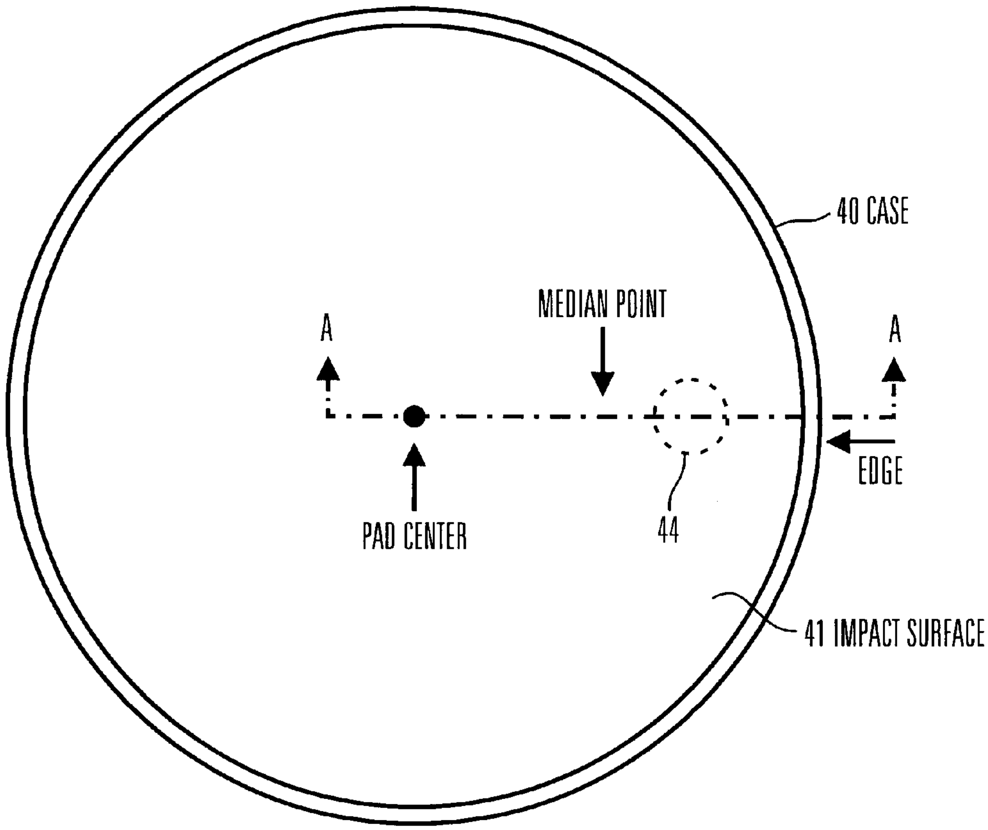
FIG. 3 is a plane drawing of the pad that is used in the electronic percussion instrument according to an embodiment of the present invention.

FIG. 3 shows a plane drawing of the pad 4 and a cross-section drawing of the pad 4 along the cross-section line A—A in FIG. 3 is shown in FIG. 1. As is shown in FIG. 3, the pad 4 is a disk that is formed with the external shape of a platter and the impact surface 41 that comprises a circular rubber pad is arranged on the upper surface of the circular dish shaped plate that is composed of a rigid body. As illustrated in FIG. 1, the circular plate shaped cushion material 42 and the pressure sensor 43 are each held in a closely sandwiched form by the impact surface 41 and the case 40 on the underside (the back side) of the impact surface 41.

The cushion material 42 is tailored so that it is a striking interface with which the sensation of striking at the time that the impact surface 41 is struck is a sense of flexibility and, together with this, possesses an action such that the striking vibration at the time of striking is not transmitted directly to the case 40 passing in a direction that falls perpendicularly to the impact surface and which attenuates the majority of the vibration. Incidentally, the striking vibrations are attenuated by the cushion material 42 as described above, however, the pressure that is applied to the impact surface when the impact surface is struck is transmitted via the cushion material 42 to the pressure sensor 43.

In addition, the edge area 41*a* of the impact surface 41 is fixed by sandwiching it between the edge area 40*a* of the case 40 and the edge area 42*a* of the cushion material 43. Also, the piezoelectric sensor 44 is attached on a place on the rear of the case 40 that is somewhat close to the edge as a vibration sensor with which the striking vibrations are detected. By this means, it is set up so that the striking vibrations that have been transmitted by the impact surface 41 when the impact surface is struck and have arrived at the edge area 40*a* are transmitted by the edge area to the case 40 and reach the piezoelectric sensor 44.

The pressure sensor 43 is something for the detection of the pressure that is received by the impact surface 41 due to the striking when the impact surface 41 has been subjected to striking and it is arranged in a planar form that covers the entire impact surface on the rear side of the impact surface 41. Here, with regard to the planar form, it may be, for example, an unbroken single plane, it may be a mesh, or it may be a sliding roll as long as it is something that can sense the striking pressure when the impact surface has been struck at any location and produce a uniform detection output.

The piezoelectric sensor 44 is a sensor with which the vibration that is produced by the striking when the impact surface has been subjected to striking is detected. This striking vibration is, primarily, the vibration that is transmitted from the impact surface 41 to the case 40 through the edge and reaches the piezoelectric sensor 44. As has been discussed previously, it is made so that the vibrations that are transmitted in a direction the falls perpendicularly from the impact point that has been struck are absorbed and attenuated in the cushion material 42 and the vast majority is not transmitted. The piezoelectric sensor 44 is attached in a location so that the lengths of the paths through which the striking vibrations at the time of striking reach the piezoelectric sensor 44 from the location of the point of impact differ in conformance with the various locations of the points of impact on the impact surface 41. Because, in this manner, the piezoelectric sensor 44 detects the striking vibrations via the impact surface 41 and the case 40, the output value of the piezoelectric sensor 44 when the edge portion has been struck is greater than in the case where the center of the pad has been struck.

Next, an explanation will be given regarding the standard point sensor output table that is stored in the ROM 2 while referring to FIG. 4. FIG. 4 shows an example of a standard point sensor output table is composed of a table of the correspondences of the output values of the pressure sensor 43 and the output values of the piezoelectric sensor 44 when the standard point of the impact surface 41 of the pad 4 has been struck with a stick. Here, a median point that is near the middle between the center and the edge of the pad on the impact surface is used as the standard point. This standard point sensor output table is produced by striking the standard point (median point) in 127 gradations of strength and deriving in advance the outputs of each sensor that correspond to each striking strength. Incidentally, in the example of FIG. 4, the output value of the pressure sensor 43 that corresponds the first gradation of striking strength is expressed as “1” and the output value of the piezoelectric sensor 44 as “P1.” In the same manner, the output value of the pressure sensor 43 that corresponds the 127th gradation of striking strength is expressed as “127” and the output value of the piezoelectric sensor 44 as “P127.”

Figure 5:
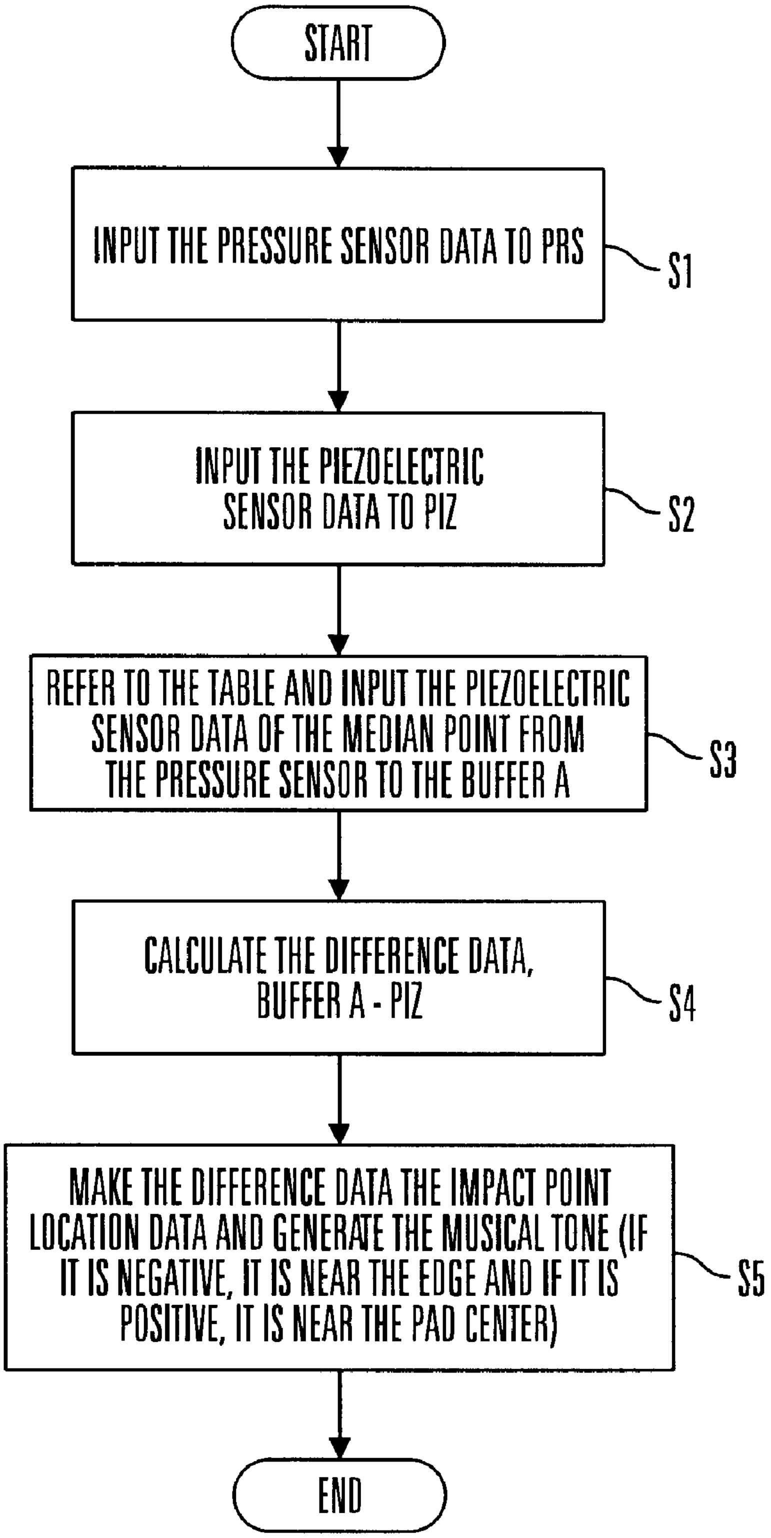
FIG. 5 is a flowchart that shows the processing flow when the impact surface of the electronic percussion instrument is struck according to an embodiment of the present invention.

An explanation will be given below of the action of this preferred embodiment system while referring to the flowchart of FIG. 5. FIG. 5 is a processing flowchart of the processing by the CPU 1 when the impact surface has been struck and is executed by means of intercalation processing.

The CPU 1 always monitors each of the output values of the pressure sensor 43 and the piezoelectric sensor 44 of the pad 4. In addition, in those cases where there has been a change in the output values of the sensors 43 and 44, the fact that the impact surface 41 “has been struck” is ascertained and, when the production of an impact surface striking is detected, the processing flow of FIG. 5 is launched as intercalation processing.

Here, an explanation will be given as follows regarding such things as each type of register of the RAM 2 that is used in the processing flow of FIG. 5.

Prs: the register that stores the output value of the pressure sensor 43 at the time of striking.

Piz: the register that stores the output value of the piezoelectric sensor 44 at the time of striking.

Buffer A: the buffer memory that refers to the standard point sensor output table of the ROM 2 and stores the output value of the piezoelectric sensor 44 (P1 through P127) from the standard point sensor output table that corresponds to the output value of the pressure sensor (1–127) at the time of striking.

When the pad 4 is struck, the CPU 1 detects the striking and launches the processing flow of FIG. 5. In this processing flow, the CPU 1 stores the output value of the pressure sensor 43 at the time of striking in the register Prs (Step S1) and, in the same manner, stores the output value of the piezoelectric sensor 44 at the time of striking in the register Piz (Step S2).

Then, the standard point sensor output table that is stored in the ROM 2 is referenced, the output value of the piezoelectric sensor 44 in the standard point sensor output table that corresponds to the above mentioned output value of the pressure sensor 43 at the time of striking is read out and stored in the buffer A (Step S3).

Next, the difference data are calculated by means of the operation "(buffer A value)−(Piz value)" (Step S4) and these difference data are made the impact point location data. With regard to what is referred to here as the impact point location data (equals the difference data), these data indicate, with the standard point (in this example, it is the median point) as the standard location, how much closer to the edge than the median point has the striking been done or how much closer to the center of the pad has it been struck. If the impact point location data are a negative value it can be determined that the striking is towards the edge and if they are positive, it can be determined that it is towards the center of the pad.

Next, tone quality processing is carried out based on the impact point location data (Step S5). This tone quality processing is processing that varies the tone quality in accordance with the location of the point of impact of the striking. If the location of the point of impact is towards the edge area, the tone quality processing is carried out to fit that and, if it is towards the center of the pad, it is carried out to fit that and a corresponding musical tone can be generated.

Incidentally, the volume of the musical tone that is generated by the sound source 5 is controlled in accordance with the value of the sum of the value of the register Prs (the output value of the pressure sensor 43) and the value of the register Piz (the output value of the piezoelectric sensor 44).

Various kinds of form variations are possible in the implementation of the present invention.

For example, in the preferred embodiment that has been discussed above, the control of the volume of the musical tone is in accordance with the value of the sum of each of the output values of the pressure sensor 43 and the piezoelectric sensor 44. However, the control of parameters such as the volume may be done with only one or the other of the output values of either the pressure sensor 43 or the piezoelectric sensor 44 or it may be set up so that the control of each separate parameter (the parameters related to the musical tone control) is done respectively with the output value of the pressure sensor 43 and piezoelectric sensor 44.

For example, control of the "tone quality" in response to the "location of the point of impact" that has been detected using the output values of both the pressure sensor 43 and the piezoelectric sensor 44, control of the "volume" using solely the output value of the pressure sensor 43 or using solely the output of the piezoelectric sensor 44 and controlling the characteristics of the "filters" that impart such things as effects to the musical tone.

Incidentally, the output value of the pressure sensor is not something that depends only on the strength of the striking and it changes depending also on the size of the area that has been struck (or pressed). That is to say, it has characteristics such that the broader the area that has been struck (or pressed), the greater the output value becomes in response to that. In addition, it also has characteristics such that the output value is not only generated when the impact surface is struck and the generation of the output value is maintained during the time that the impact surface is pressed. Therefore, the output of the pressure sensor may be used in musical tone control applications that fit those characteristics making the best use of the characteristics possessed by the pressure sensor.

In addition, in the preferred embodiment that was discussed above, it was explained with regard to the system that it was set up so that the location of the point of impact is always detected whenever there is a striking. However, the present invention is not something that is limited to this and, for example, it may also be set up so that a mode changing switch is installed in the main body system and its is possible to switch between a mode in which the location of the point of impact is detected and a mode in which it is not detected. In addition, it may also be set up so that, in the mode in which the location of the point of impact is not detected, the pressure sensor 43 and the piezoelectric sensor 44 are used to control separate parameters.

In addition, in the preferred embodiment that was discussed above, it was made so that the tone quality is changed in conformance with the location of the point of impact. However, the present invention is not something that is limited to this and it is possible to apply the present invention so that the filters that impart the various effects to the musical tone are controlled and so that all kinds of parameters of the musical tones of the sound source 5 including those such as the pan pot and the pitch are controlled.

In addition, in the preferred embodiment that was discussed above, a median point was set as the standard point, the sensor output table was derived in advance from each of the output values of the pressure sensor 43 and the piezoelectric sensor 44 for each of the striking strengths when the standard point was struck and the location of the point of impact was determined based on the difference value between the actual output value of the piezoelectric sensor 44 and the output value of the piezoelectric sensor 44 that had been extracted from the sensor output table indexed by the output value of the pressure sensor 43. However, the present invention is not something that is limited to this and the sensor output table can be derived from the corresponding relationships between the output values of the pressure sensor 43 and the piezoelectric sensor 44 for any of the locations of the points of impact anywhere over the entire impact surface as required as well as the standard point, having it set up so that the location of the point of impact is determined by referring to this sensor output table for each of the output values of the pressure sensor 43 and the piezoelectric sensor 44 at the time of striking.

In addition, in the preferred embodiment that has been discussed above, the piezoelectric sensor 44 is used as the sensor to detect the striking vibrations. However, it is not limited to that and it is possible to use a sensor of any of various kinds of formats as a substitute for the piezoelectric sensor as long as it is a sensor that can detect the striking vibrations. In the same manner, with regard to the pressure sensor also, it is possible to use sensors of various kinds of formats that can detect the pressure that has been applied.

In addition, in the preferred embodiment that has been discussed above, the cushion material 42 was used as the structure with which the striking vibrations at the time of striking in the direction that falls perpendicularly from the point of impact are attenuated. However, the present invention is not something that is limited to this and, for example, it may be set up with a structure in which the impact surface is affixed to the case edge, the pressure sensor is attached directly to the rear of the impact surface and, together with this, the area of the cushion material 42 is made empty.

In addition, the impact surface is not limited to the rubber pad of this preferred embodiment and various kinds of materials may be employed.

Figure 6:
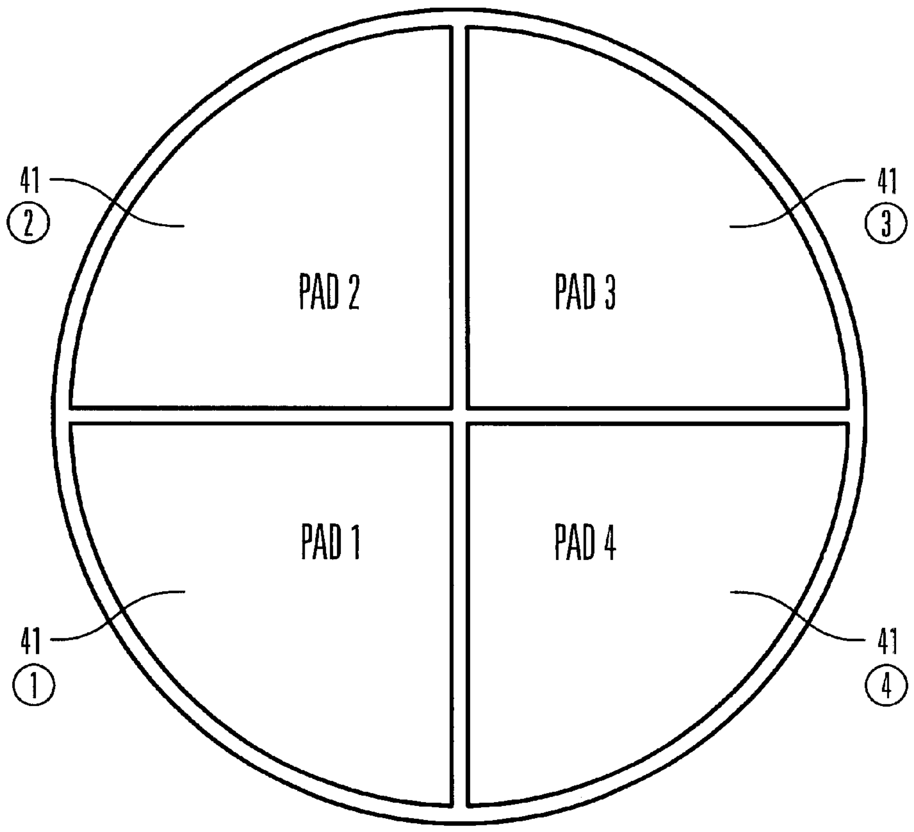
FIG. 6 is a plane drawing of the pad, which has a divided form impact surface, that is used for an electronic percussion instrument according to an embodiment of the present invention.

In addition, in the preferred embodiment that has been discussed above, it has been set up so that the planar form pressure sensor 43 is attached to correspond to the entire impact surface of the pad sandwiched between the rear of the impact surface and the cushion material 42. However, the present invention is not something that is limited to this. For example, as is shown in FIG. 6, it may be set up so that the impact surface 41 of the pad 4 is divided into four in a fan shape and planar form pressure sensors arranged independently on the rear of each of the divided impact surfaces 41(1) through 41(4). That is to say, in all, four pressure sensors are attached and each sensor only generates an output value when the division of the impact surface that corresponds to it has been struck. In addition, with regard to the piezoelectric sensor with which the striking vibrations are detected, it is preferable that they also be arranged for each divided impact surface 41(1) through 41(4). However, it is also possible, for example, to have one piezoelectric sensor arranged on the case 40 in a location that corresponds to the center point of the pad and to reduce the number that are installed.

An explanation will be given below of a concrete example of the control of each kind of musical tone by the output of the sensor at the time of striking in this type of case in which the impact surface has been divided into a multiple number.

Figure 7:
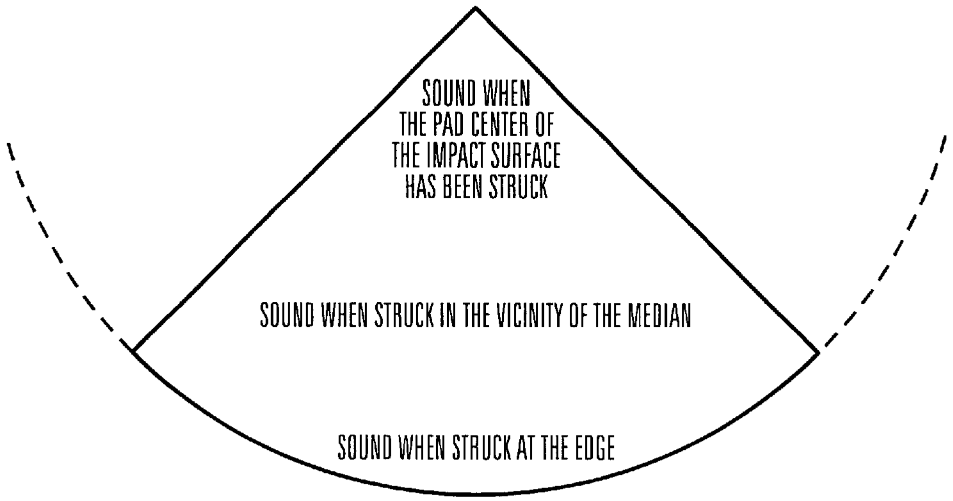
FIG. 7 is a drawing that shows an illustration of parameter control by means of the sensor output (control of the tone quality by means of the location of the point of impact) according to an embodiment of the present invention.

FIG. 7 is an illustration in which it has been set up so that the tone quality control can be switched in three stages in accordance with the location of the point of impact that has been detected (toward the center of the pad, in the vicinity of the median point and towards the edge). In this case, the strength at which the pad has been struck is derived from the output value of the pressure sensor 43 or the output value of the piezoelectric sensor 44 and it is set up so that the required parameters are controlled at the time of tone quality control. For example, in the case where the volume of the musical tone is controlled, when it is struck hard, a large sound is produced and when it is struck weakly, a small sound is produced.

Figure 8:
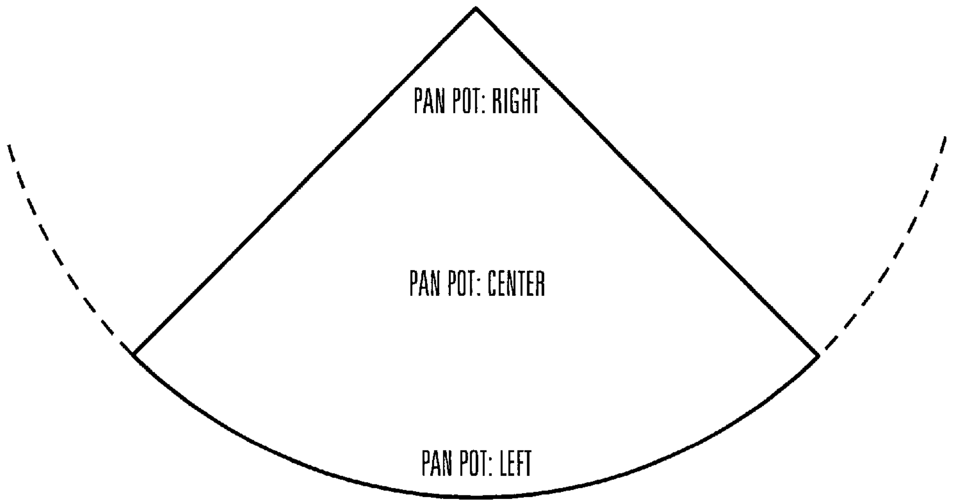
FIG. 8 is a drawing that shows an illustration of parameter control by means of the sensor output (control of the pan pot by means of the location of the point of impact) according to an embodiment of the present invention.

FIG. 8 is an illustration of the control of the pan pot (stereo image orientation) in accordance with the location of the point of impact that has been detected. It is set up so that the pan pot control parameter changes continuously in accordance with the location of the point of impact that has been detected and, on the other hand, it is set up so that the pan pot control parameter change does not reflect the strength at which the pad has been struck. For example, in the case where the pan pot parameter is controlled, the stereo image is oriented to the right side when the center of the pad is struck, the stereo image is oriented to the left side when the edge is struck and the stereo image is oriented in a center location when the striking is in the vicinity of the median point. In addition, as has been described above, in this illustration, the strength at which the impact surface is struck is not used for the control of the pan pot of the musical tone but the striking strength data may be used for other parameter and tone quality controls.

Figure 9:
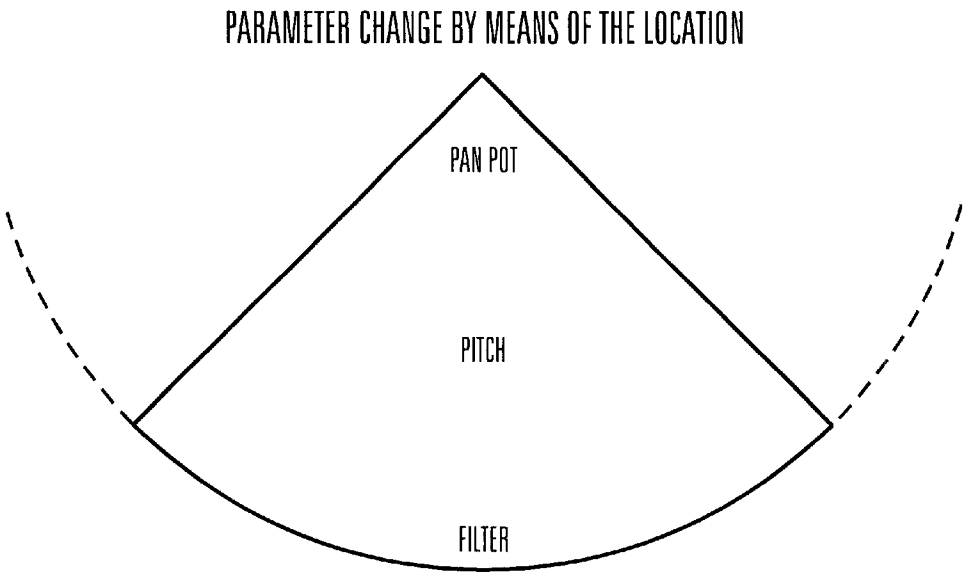
FIG. 9 is a drawing that shows an illustration of parameter control by means of the sensor output (control of the switching of the parameter type by means of the location of the point of impact) according to an embodiment of the present invention.

FIG. 9 is an illustration of the changes in the details of the musical tone control (that is to say, the types of parameters that are controlled) in accordance with the location of the point of impact that has been detected. In this illustration, it is set up so that the control of specified parameters at the time of the tone quality control is done by means of the data for the strength at which the pad has been struck (the output value of the pressure sensor or of the piezoelectric sensor). For example, the control of the volume of the generated tone by means of the strength of the striking is done so that the volume of the musical tone that is generated is great when the striking is hard and low when the striking is weak. In addition, the control can be done so that, in a case where the impact surface has been struck in the pad center, the pan pot is changed in accordance with the strength of the striking and, in a case where the impact surface has been struck on the edge, such characteristics as each of the various effects that are imparted to the musical tone by the filters are changed in accordance with the strength of the striking or it may set up so that, in a case where the impact surface is struck in the vicinity of the median point, the pitch of the musical tone is changed in accordance with the strength of the striking.

Figure 10:
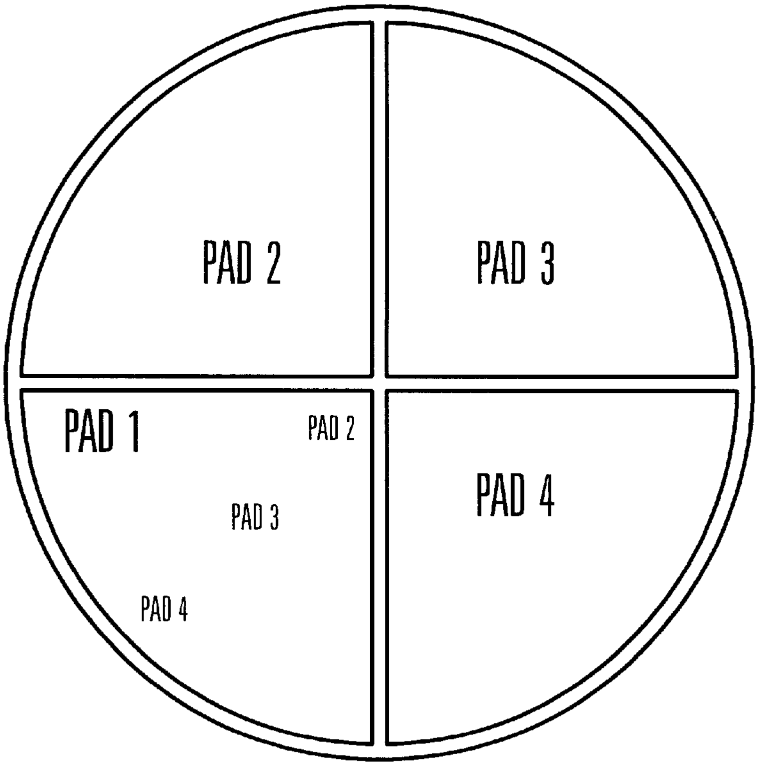
FIG. 10 is a drawing that shows an illustration of parameter control by means of the sensor output (control of the switching of the divided impact surface of the pad by means of the location of the point of impact) according to an embodiment of the present invention.

FIG. 10 is an illustration of the control in which the divided impact surfaces (divided pads) are switched in accordance with the location of the point of impact on one specified divided impact surface. Here, the divided impact surface 41(1) is the impact surface that is used for switching direction and the remaining divided impact surfaces 41(2) through 41(4) are each set in advance for other kinds of parameters that are to be controlled. It is only possible for parameter control to be done by the divided impact surface that has been directed to be switched to by the divided impact surface 41(1). For example, each is controlled in accordance with the strength at which the respective impact surface is struck: the pitch of the musical tone by the divided impact surface 41(2), the modulation of the musical tone by the divided impact surface 41(3) and the resonance of the musical tone by the impact surface 41(4). The switching direction by the divided impact surface 41(1) that is used for switching direction is set so that the divided impact surface 41(2) is selected when the pad center is struck, the divided impact surface 41(3) is selected when it is struck in the vicinity of the median point and the divided impact surface 41(4) is selected when the edge is struck.

Therefore, embodiments of the present invention provide an apparatus and method which detects the point of impact on an electronic percussion instrument with a small number of sensors rather than a large array of sensors, providing the added advantages of reducing the processing load on the processor that receives output values from the sensors and minimizing device complexity. In addition, embodiments of the present invention to provide an apparatus and method for controlling the musical tone in conformance with the point of impact, and for controlling different musical tone parameters using the output values of multiple sensors.

What is claimed is:

1. An apparatus for detecting and processing impacts to an electronic percussion instrument, the electronic percussion instrument producing an audio signal in response to said impacts, the apparatus comprising:

at least one pad for being impacted with an impact pressure at an impact location;

at least one first sensor located in close proximity to the at least one pad for producing at least one first output signal having a value corresponding to the impact pressure;

at least one second sensor located in close proximity to the at least one pad for producing at least one second output signal having a value corresponding to the impact location and the impact pressure; and at least one processor programmed for determining a computed impact location from the magnitude of the at least one first and second output values, wherein a characteristic of the audio signals produced by the electronic percussion instrument is determined by the impact pressure.

2. An apparatus for detecting and processing impacts to an electronic percussion instrument as recited in claim 1, the at least one processor further including a reference table that has been derived in advance with regard to a standard impact location, the reference table containing various impact pressures at the standard impact location and associated second output values produced by the various impact pressures;

wherein the computed impact location is determined by comparing the first output value and the second output value with the reference table.

3. An apparatus for detecting and processing impacts to an electronic percussion instrument, the electronic percussion instrument producing an audio signal in response to said impacts, the apparatus comprising:

at least one pad of said electronic percussion instrument for receiving impacts at an impact location and generating impact vibrations and impact pressure in response to the impacts;

at least one first sensor located in close proximity to the at least one pad for producing at least one first output signal having a value that is substantially independent of impact location, but dependent on the magnitude of the impact pressure;

at least one second sensor located in close proximity to the at least one pad for producing at least one second output signal having a value dependent on the impact vibrations; and at least one processor in communication with the at least one first sensor and the at least one second sensor and programmed for determining a computed impact location from the at least one first and second output values, wherein a characteristic of the audio signal is determined by the impact pressure.

4. An apparatus for detecting and processing impacts to an electronic percussion instrument as recited in claim 3, wherein the at least one processor is further programmed for controlling an output sound in conformance with the computed impact location.

5. An apparatus for detecting and processing impacts to an electronic percussion instrument as recited in claim 4, wherein each pad is divided into one or more regions, and at least one first sensor is coupled to each region.

6. An apparatus for detecting and processing impacts to an electronic percussion instrument as recited in claim 5, the at least one processor further programmed for varying parameters of the output sound in accordance with a location of the computed impact location within a particular pad.

7. An apparatus for detecting and processing impacts to an electronic percussion instrument as recited in claim 5, the at least one processor further programmed for varying parameters of the output sound in accordance with a magnitude of the impact pressure at the computed impact location within a particular pad.

8. An apparatus for detecting and processing impacts to an electronic percussion instrument as recited in claim 4, the at least one processor further including a reference table corresponding to a standard impact location, the reference table containing a mapping of various first output values and associated second output values produced at the standard impact location;

wherein the at least one processor is further programmed for determining the computed impact location by comparing the at least one first output value and the at least one second output value with the reference table.

9. An apparatus for detecting and processing impacts to an electronic percussion instrument as recited in claim 8, the at least one processor further programmed for determining the computed impact location by:

storing an actual first output value resulting from an impact into a first register;

storing an actual second output value resulting from the impact into a second register;

accessing the reference table to locate an associated second output value corresponding to the actual first output value; and comparing the associated second output value to the actual second output value to determine the computed impact location.

10. An apparatus for detecting and processing impacts to an electronic percussion instrument as recited in claim 9, the at least one processor further programmed for varying parameters of the output sound in accordance with the actual first output value and the actual second output value.

11. An apparatus for detecting and processing impacts to an electronic percussion instrument as recited in claim 9, the at least one processor further programmed for varying a tone quality of the output sound in accordance with the computed impact location.

12. An apparatus for detecting and processing impacts to an electronic percussion instrument as recited in claim 9, the at least one processor further programmed for varying a volume of the output sound in accordance with a sum of the actual first output value and the actual second output value.

13. An apparatus for detecting and processing impacts to an electronic percussion instrument as recited in claim 3, wherein the at least one second output value is dependent on the impact location and the impact pressure.

14. An apparatus for detecting and processing impacts to an electronic percussion instrument as recited in claim 3, further including a cushioning material disposed between the at least one pad and the at least one first sensor for communicating impact pressure to the at least one first sensor.

15. An apparatus for detecting and processing impacts to an electronic percussion instrument as recited in claim 6, the at least one processor programmed for defining a control pad wherein, by varying the computed impact location within the control pad, other pads are selected from which parameters of the output sound are varied in accordance with the computed impact location within those pads.

16. A method for detecting and processing impacts to an electronic percussion instrument, the method comprising the steps of:

receiving impacts at an impact location on at least one pad of said electronic percussion instrument and generating impact vibrations and impact pressure in response to the impacts;

communicating the impact pressure to at least one first sensor for producing at least one first output signal having a value that is substantially independent of impact location, but dependent on the magnitude of the impact pressure;

communicating the impact vibrations to at least one second sensor for producing at least one second output signal having a value dependent on the impact location; and determining a computed impact location from the at least one first and second output values.

17. A method for detecting and processing impacts to an electronic percussion instrument as recited in claim 16, further including the step of controlling an output sound in conformance with the computed impact location.

18. A method for detecting and processing impacts to an electronic percussion instrument as recited in claim 17, wherein the step of receiving impacts at an impact location on at least one pad further includes receiving impacts at an impact location on one or more regions on each pad.

19. A method for detecting and processing impacts to an electronic percussion instrument as recited in claim 18, the method further including the step of varying parameters of the output sound in accordance with a location of the computed impact location within a particular pad.

20. A method for detecting and processing impacts to an electronic percussion instrument as recited in claim 18, the method further including the step of varying parameters of the output sound in accordance with a magnitude of the impact pressure at the computed impact location within a particular pad.

21. A method for detecting and processing impacts to an electronic percussion instrument as recited in claim 17, the method further including the steps of:

generating a reference table corresponding to a standard impact location, the reference table containing a mapping of various first output values and associated second output values produced at the standard impact location; and determining the computed impact location by comparing the at least one first output value and the at least one second output value with the reference table.

22. A method for detecting and processing impacts to an electronic percussion instrument as recited in claim 21, the step of determining the computed impact location further including the steps of:

storing an actual first output value resulting from an impact into a first register;

storing an actual second output value resulting from the impact into a second register;

accessing the reference table to locate an associated second output value corresponding to the actual first output value; and comparing the associated second output value to the actual second output value to determine the computed impact location.

23. A method for detecting and processing impacts to an electronic percussion instrument as recited in claim 22, the method further including the step of varying parameters of the output sound in accordance with the actual first output value and the actual second output value.

24. An apparatus for detecting and processing impacts to an electronic percussion instrument as recited in claim 22, the method further including the step of varying a tone quality of the output sound in accordance with the computed impact location.

25. A method for detecting and processing impacts to an electronic percussion instrument as recited in claim 22, the method further including the step of varying a volume of the output sound in accordance with a sum of the actual first output value and the actual second output value.

26. A method for detecting and processing impacts to an electronic percussion instrument as recited in claim 16, wherein the at least one second output value is dependent on the impact location and the impact pressure.

27. An apparatus for detecting and processing impacts to an electronic percussion instrument as recited in claim 16, the method further including the steps of:

inserting a cushioning material between the pad and the at least one first sensor for communicating impact pressure to the at least one first sensor; and inserting a cushioning material between the pad and the at least one second sensor for attenuating impact vibrations to the at least one second sensor.

28. A method for detecting and processing impacts to an electronic percussion instrument as recited in claim 19, the method further including the step of defining a control pad wherein, by varying the computed impact location within the control pad, other pads are selected from which parameters of the output sound are varied in accordance with the computed impact location within those pads.

29. An apparatus for detecting and processing impacts to an electronic percussion instrument comprising:

at least one pad of said electronic percussion instrument for receiving impacts at an impact location and generating impact vibrations and impact pressure in response to the impacts;

a case adjacent to the at least one pad for supporting the at least one pad and communicating impact vibrations generated by the at least one pad, an edge area of the case enclosing the at least one pad;

at least one first sensor operatively coupled to the at least one pad for producing at least one first output signal having a value dependent on the impact pressure;

at least one second sensor coupled to the case for receiving impact vibrations from the case and producing at least one second output signal having a value dependent on the impact vibrations; and at least one processor in communication with the at least one first sensor and the at least one second sensor and programmed for determining a computed impact location from the at least one first and second output values.

30. An apparatus for detecting and processing impacts to an electronic percussion instrument as recited in claim 29, further including a cushioning material disposed between the at least one pad and the at least one first sensor, and between the at least one pad and the case, for attenuating impact vibrations to the case and communicating impact pressure to the at least one first sensor.

31. An apparatus for detecting and processing impacts to an electronic percussion instrument as recited in claim 29, wherein the at least one second sensor is coupled to the case near the edge of the case.

32. An apparatus for detecting and processing impacts to an electronic percussion instrument as recited in claim 29, wherein the at least one first sensor has an output value that is substantially independent of impact location, but dependent on the magnitude of the impact.

33. An apparatus for detecting and processing impacts to an electronic percussion instrument as recited in claim 29, wherein the at least one first sensor comprises a generally planar member that extends coplanar with a substantial part of the impact surface.

34. An apparatus for detecting and processing impacts to an electronic percussion instrument, comprising:

at least one pad of said electronic percussion instrument for receiving impacts at an impact location and generating impact vibrations and impact pressure in response to the impacts, wherein at least one of the pads is divided into two or more regions;

at least one first sensor located in close proximity to the at least one pad for producing at least one first output signal having a value dependent on the impact pressure, wherein at least one first sensor is located in each region and wherein each first sensor only generates an output value when the region of the pad in which the sensor is located has been struck;

at least one second sensor located in close proximity to the at least one pad for producing at least one second output signal having a value dependent on the impact vibrations; and at least one processor in communication with the at least one first sensor and the at least one second sensor and programmed for determining a computed impact location from the at least one first and second output values.

35. An apparatus for detecting and processing impacts to an electronic percussion instrument as recited in claim 34, the at least one processor programmed for defining a control region wherein, by varying the computed impact location within the control region, other regions are selected from which parameters of the output sound are varied in accordance with the computed impact location within those regions.

36. An apparatus for detecting and processing impacts to an electronic percussion instrument, comprising:

at least one pad of said electronic percussion instrument for being impacted with an impact pressure at an impact location;

at least one first sensor located in close proximity to the at least one pad for producing at least one first output signal having a value corresponding to the impact pressure;

at least one second sensor located in close proximity to the at least one pad for producing at least one second output signal having a value corresponding to the impact location and the impact pressure; and at least one processor programmed for determining a computed impact location from the magnitude of the at least one first and second output values, and for controlling the amplitude of an output sound based on the magnitude of one or both of the first and second output values.

37. An apparatus for detecting and processing impacts to an electronic percussion instrument as recited in claim 36, wherein the processor is programmed so that the amplitude of the output sound is dependent on the impact location.

38. An apparatus for detecting and processing impacts to an electronic percussion instrument as recited in claim 36, wherein the processor is programmed so that the amplitude of the output sound is dependent on the impact pressure.

39. An apparatus for detecting and processing impacts to an electronic percussion instrument, comprising:

at least one pad of said electronic percussion instrument for being impacted with an impact pressure at an impact location;

at least one first sensor located in close proximity to the at least one pad for producing at least one first output signal having a value corresponding to the impact pressure;

at least one second sensor located in close proximity to the at least one pad for producing at least one second output signal having a value corresponding to the impact location and the impact pressure; and at least one processor operable with a reference table for determining a computed impact location from the magnitude of the at least one first and second output values, the reference table associating a plurality of impact pressures with an associated plurality of second output values for a standard impact location;

wherein the computed impact location is determined by comparing the at least one first and second output values with the reference table.

40. A method for detecting and processing impacts to an electronic percussion instrument, the method comprising the steps of:

providing a reference table with regard to a standard impact location, the reference table containing various impact pressures at the standard impact location and associated impact vibrations produced by the various impact pressures;

receiving impacts at an impact location on at least one pad of said electronic percussion instrument and generating impact pressure and impact vibrations in response to the impacts; and determining a computed impact location by comparing the generated impact pressure and impact vibrations with the reference table.

41. An apparatus for detecting and processing impacts to an electronic percussion instrument as recited in claim 1, wherein there are more than two levels of gradation for the magnitude of the first and second output values used to determine the impact location.

42. An apparatus for detecting and processing impacts to an electronic percussion instrument as recited in claim 3, further comprising:

a case adjacent to the at least one pad for supporting the at least one pad and communicating impact vibrations generated by the at least one pad;

wherein the at least one first sensor is supported on the case; and wherein the at least one second sensor is coupled to the case.

43. An apparatus for detecting and processing impacts to an electronic percussion instrument as recited in claim 3, wherein the at least one first sensor comprises a generally planar member that extends coplanar with a substantial part of the impact surface.

44. An apparatus for detecting and processing impacts to an electronic percussion instrument as recited in claim 3, wherein the at least one second sensor is a piezoelectric sensor.

45. The apparatus of claim 36, wherein a characteristic of the output sound depends on a magnitude of the at least one first output signal.

* * * * *